UNITED STATES PATENT OFFICE.

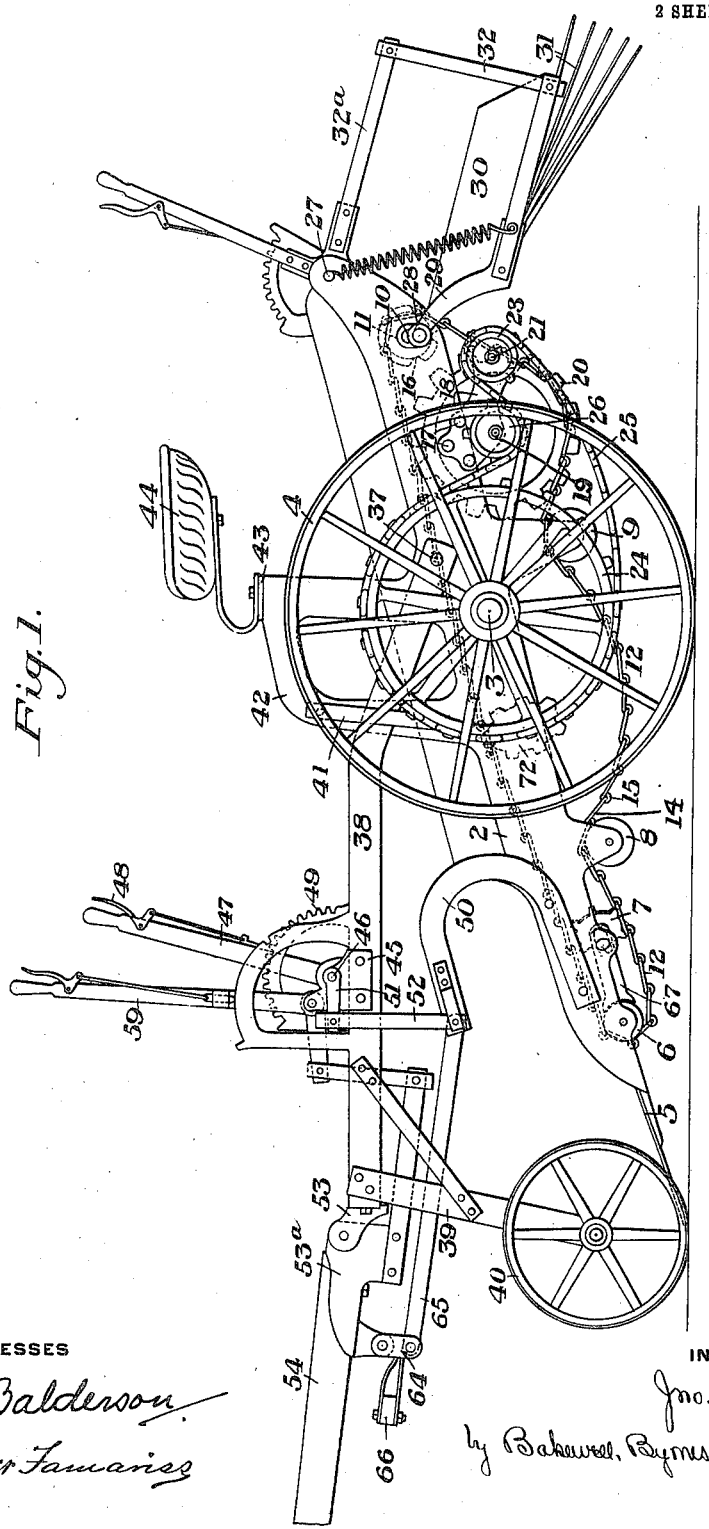

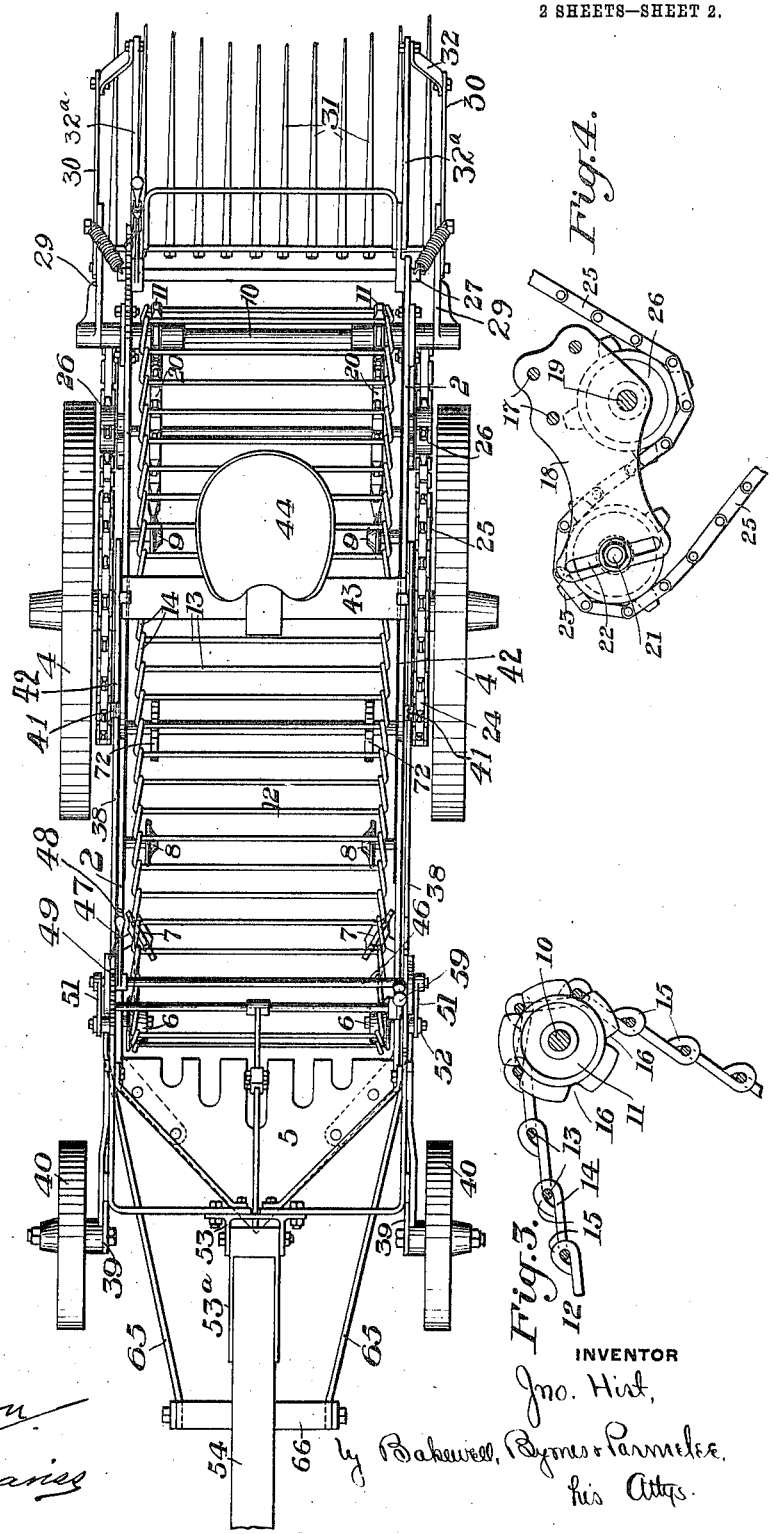

JOHN HIST, OF BARBERTON, OHIO.

POTATO-DIGGER.

1,037,006.      Specification of Letters Patent.      Patented Aug. 27, 1912.

Application filed January 22, 1910. Serial No. 539,515.

*To all whom it may concern:*

Be it known that I, JOHN HIST, of Barberton, Summit county, Ohio, have invented a new and useful Improvement in Potato-Diggers, of which the following is a full, clear, and exact description, reference being had to the accompanying drawings, forming part of this specification, in which—

Figure 1 is a side elevation of one form of my improved potato digger. Fig. 2 is a plan view. Fig. 3 is a detail view of the conveyer apron and shaker crank shaft driving wheel. Fig. 4 is a detail sectional view showing the adjusting mechanism for the conveyer driving chains.

This invention relates to potato diggers having a shovel at the front which is arranged to scoop up the potatoes and the soil in which they are contained and pass the whole to a traveling apron, which conveys the potatoes and soil to a shaker which is vibrated to shake the potatoes from the vines, the loose soil dropping through the orifices in the conveyer, and the vines of potatoes being deposited on the shaker at the rear and from which they are deposited on the upper surface of the ground.

The object of my invention is to provide a cheap and efficient machine of the character described in which the main or mechanism supporting frame is supported on the axle of the supporting wheels.

Another object of my invention is to provide means for readily adjusting the tension of the traveling apron driving chain.

The precise nature of my invention will be best understood by reference to the accompanying drawings which will now be described, it being premised, however, that various changes may be made in the details of construction and general arrangement of the parts without departing from the spirit and scope of my invention as defined in the appended claims.

In the drawings, the numeral 2 designates the main frame.

3 is the axle which passes through the main frame and is secured thereto, and 4 are the main or supporting wheels journaled on the outer ends of the axle 3. Secured to the front end of the frame 2 is a shovel 5. Journaled on pins secured to the frame 2 are the wheels or rollers 6, 7, 8 and 9. Journaled in the frame 2 is a crank shaft 10, and secured to this crank shaft and within the frame 2 are the sprocket wheels 11.

12 is a conveyer composed of the transverse bars 13, end bars 14 and eyes 15. The eyes 15 of each of the end bars 14 surround the transverse bar 13 of an adjacent member, and are adapted to rotate therein while passing over the various idlers and sprocket wheels. This conveyer 12 is supported on the rollers 6, 8 and 9, and passes under the rollers 7, and also passes over the sprocket wheels 11, the transverse rods 13 entering the grooves 16 and engaging adjacent teeth in the sprocket wheel. The distance from center to center of these grooves 16 is about equal to the distance from center to center of the transverse bars 13, and the grooves are tapered outwardly to provide an enlarged opening to allow the bars to enter.

Secured to the rear end of the frame 2 by means of the rivets 17 is a bracket 18. Journaled in this bracket is a shaft 19, and secured to each end of the shaft and within the main frame 2 are the apron driving sprocket wheels 20, the teeth of which are adapted to engage the transverse bars 13 of the conveyer.

21 is a shaft which is adjustably mounted in a slot 22 in the bracket 18, and loosely mounted on each end thereof is a sprocket wheel 23.

24 are sprocket wheels loosely mounted on each end of the axle 3 and these are connected with the supporting wheels 4 so as to be rotated thereby when the digger is moved forwardly.

25 are sprocket chains, one on each side of the machine, and each of these sprocket chains engages a sprocket wheel 24—23 and a sprocket wheel 26 secured to the conveyer driving shaft 19. When the digger is moved forwardly or drawn over the ground, the wheels 4 will transmit power to the conveyer driving shaft 19 through the medium of the sprocket chains 25, and the sprocket wheels 26, which will in turn drive the conveyer apron through the medium of the sprocket wheels 20.

Journaled in the rear end of the frame 2 is a rock shaft 27, and pivotally mounted on this rock shaft are the arms 32ª. Connected to each end of the crank shaft 10 is a crank 28, and pivotally connected to each of these cranks is an arm 29, each of which is connected to one side of a shaker 30, 32 are links which connect the rear ends of the arms 32ª with the rear ends of the sides of the shaker 30.

It will be readily understood by those familiar with the art that the rotation of the conveyer will vibrate the shaker 30 through the medium of the crank shaft 10 and cranks 28.

Pivotally mounted to the main frame 2 at 37 is an auxiliary frame 38, and secured to the forward end of this frame 38 is a frame or bracket 39, the lower ends of which are provided with the gage wheels 40. The auxiliary frame 38 passes through guides 41 on the upwardly extending portion 42 of the frame 2. The upper portion of these extensions 42 are secured together by means of a cross bar 43 on which the driver's seat 44 is secured.

Pivotally mounted in brackets 45 on the auxiliary frame 38 is a rock shaft 46, and secured to this rock shaft 46 is a hand lever 47, having a spring pressed locking lever 48, arranged to engage the teeth in a rack 49 to lock the shaft 46 in its adjusted position. Extending upwardly and forwardly from each side of the main frame 2 is a goose neck 50. The outer ends of the rock shafts 46 are provided with cranks 51, each of which is connected by means of a link 52 with one of the goose necks 50, and by raising or lowering the operating lever 47, the front of the main frame and with it the shovel 5 may be raised and lowered.

Pivotally mounted in a bracket 53 on the front end of the auxiliary frame 38 is a tongue frame 53ª, to which is secured the tongue 54, which is arranged to be adjusted with relation to the frame 38 by means of a hand lever 59. Pivotally supported at the front end of the tongue frame 53ª are links 64, the lower ends of which are connected by means of a pair of rods 65 with the goose necks 50. Connected to the center portion of these links 64 is a bar 66 to which the double tree is connected.

The operation of the device is as follows: When the digger is moved to the point where the potatoes are to be harvested, the shovel and the main frame are lowered to their proper position by means of the operating lever 47, and are locked in their adjusted position by means of the locking lever 48. The gage wheels 40 and the main wheels 4 prevent the shovel from going beyond the adjusted depth. The device is drawn forward through the connecting links 65 with the double tree 66. While the shovel is moved through the soil, the soil and potatoes will be raised on the shovel and to the conveyer 12, and will be conveyed upwardly and deposited on the shaker 30. The conveyer belt is agitated by means of an agitator 72 which is pivotally mounted to the main frame 2, which will raise and lower the conveyer to break up the lumps and allow the small particles of dirt to drop between the bars of the conveyer to the ground, the potatoes and vines being carried upwardly and deposited on the shaker 30. As previously described, this shaker 30 is vibrated through the medium of the cranks 28 and the crank shafts 10, which will tend to loosen the potatoes from the vines and drop them on the ground. If the shovel has been set too deep or not deep enough, it can be adjusted by the movement of the operating lever 47. If it is desired to increase the tension on the driving chains 25, the shaft 21 can be moved in the slots 22 and the brackets 18, and thereby increase the tension on these chains.

The advantages of my invention result from the provision of means for supporting all of the operating mechanism on the main frame which is mounted on the axle of the driving or main supporting wheels. Further in the provision of an auxiliary frame which is pivoted to the main frame beyond the supporting axle, and is guided in suitable guides on the sides of the main frame which will hold the two frames in longitudinal alinement. By the provision of a sprocket wheel which is provided with recesses for engaging both sides of the transverse bars of the conveyer, I am enabled to overcome the back lash in the crank shaft and thereby provide a continuously moving shaft to operate the shaker.

I claim:

1. A potato digger having a wheel-supported axle, a main frame mounted on said axle and arranged to be moved about the axis thereof, a shovel connected to the main frame, sprocket wheels mounted at one end of the main frame, rollers mounted at the other end portion of the main frame, an endless conveyer mounted on said wheels and rollers, a sprocket wheel arranged to be rotated by the supporting wheels, a driving sprocket wheel for the conveyer having chain connection with the sprocket wheel rotated by the supporting wheels, an auxiliary frame pivotally connected to the main frame, and mechanism for adjusting the main frame relative to the auxiliary frame without changing the relation of the conveyer chain to its driving mechanism, substantially as described.

2. A potato digger having a wheel-supported axle, a main frame mounted on said axle and arranged to be moved about the axis thereof, a shovel connected to the main frame, sprocket wheels mounted at one end of the main frame, rollers mounted at the other end portion of the main frame, an endless conveyer mounted on said wheels and rollers, a sprocket wheel arranged to be rotated by the supporting wheels, a driving sprocket wheel for the conveyer having chain connection with the sprocket wheel rotated by the supporting wheels, an auxiliary frame pivotally connected to the main frame, mechanism for adjusting the main frame relative to the auxiliary frame without changing the relation of the conveyer chain to its driving mechanism, and mechanism for adjusting the tension of the sprocket chain without varying the tension of the conveyer, substantially as described.

3. A potato digger having a wheel-supported axle, a main frame mounted on said axle and adapted to be moved about the axis thereof, a shovel connected to the main frame, sprocket wheels at one end and rollers at the other end of the main frame, an endless conveyer mounted on said wheels and rollers, conveyer-driving sprocket wheels mounted on a shaft journaled in the frame and engaging the return portion of the conveyer, a sprocket wheel arranged to be rotated by the supporting wheels, a sprocket wheel secured to the shaft of the conveyer-driving sprocket wheels, said last mentioned sprocket wheel being connected to the sprocket wheel rotated by the supporting wheels by means of a sprocket chain, an auxiliary frame pivotally connected to the main frame, and means to adjust the main frame with relation to the auxiliary frame without changing the relation of the conveyer chain with relation to its driving mechanism, substantially as described.

4. A potato digger having a wheel-supported axle, a main frame mounted on said axle and adapted to be moved about the axis thereof, a shovel connected to the main frame, sprocket wheels at one end and rollers at the other end of the main frame, an endless conveyer movably mounted on said wheels and rollers, conveyer-driving sprocket wheels mounted on a shaft journaled in the main frame and engaging the return portion of the conveyer, a sprocket wheel adapted to be rotated by the supporting wheels, a sprocket wheel secured to the shaft of the conveyer driving sprocket wheels, sprocket wheels connected to the last mentioned sprocket wheel by means of a sprocket chain, and means to adjust the tension of the sprocket chain without varying the tension of the conveyer, substantially as described.

In testimony whereof, I have hereunto set my hand.

JOHN HIST.

Witnesses:
O. D. EVERHARD,
GEO. T. BERTT.